(12) United States Patent
Barcay et al.

(10) Patent No.: US 10,709,128 B2
(45) Date of Patent: Jul. 14, 2020

(54) METHOD AND APPARATUS FOR BIRD CONTROL

(71) Applicant: Ecolab USA Inc., Saint Paul, MN (US)

(72) Inventors: Stephen John Barcay, Burnsville, MN (US); Terry Leland Elichuk, Eden Prairie, MN (US); Ralph Vincent Harris, Woodbury, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 16/119,524

(22) Filed: Aug. 31, 2018

(65) Prior Publication Data

US 2019/0059357 A1 Feb. 28, 2019

Related U.S. Application Data

(60) Provisional application No. 62/552,942, filed on Aug. 31, 2017.

(51) Int. Cl.
| *A01M 29/32* | (2011.01) |
| *A01M 29/10* | (2011.01) |
| *E04D 13/00* | (2006.01) |
| *A01M 23/02* | (2006.01) |
| *A01M 29/16* | (2011.01) |

(52) U.S. Cl.
CPC ............ *A01M 29/32* (2013.01); *A01M 23/02* (2013.01); *A01M 29/10* (2013.01); *A01M 29/16* (2013.01); *E04D 13/004* (2013.01)

(58) Field of Classification Search
CPC ...... A01M 29/32; A01M 23/02; A01M 29/10; A01M 29/16; A01M 29/30; E04D 13/004
See application file for complete search history.

(56) References Cited

U.S. PATENT DOCUMENTS

| 4,791,753 | A | * | 12/1988 | Fuhrman | A01M 23/32 43/63 |
| 4,937,988 | A | * | 7/1990 | Gratton | A01K 39/01 256/11 |
| 5,209,032 | A | * | 5/1993 | Laumeister | A01M 29/32 52/101 |
| 5,454,183 | A | * | 10/1995 | Antonini | A01M 29/32 43/1 |
| 5,966,862 | A | * | 10/1999 | Ueno | A01M 23/32 43/58 |

(Continued)

FOREIGN PATENT DOCUMENTS

| CN | 202354274 | 8/2012 |
| CN | 204634868 U | 9/2015 |

(Continued)

OTHER PUBLICATIONS

"Bird X Laser for indoors", (accessed Sep. 15, 2017), 1 page.

(Continued)

*Primary Examiner* — Adriana Figueroa
(74) *Attorney, Agent, or Firm* — Schwegman Lundberg & Woessner, P.A.

(57) ABSTRACT

A bird trapping system including one or more mist nets configured to be positioned in a building, a multi projection laser system positioned in an angled location or a vertical location relative to the one or more mist nets, the system designed to safely capture birds for removal and release from a building or structure.

30 Claims, 12 Drawing Sheets

(56) References Cited

U.S. PATENT DOCUMENTS

| | | | | |
|---|---|---|---|---|
| 6,082,285 A | * | 7/2000 | Hinrichs | B63B 17/02 114/343 |
| 6,508,204 B1 | * | 1/2003 | Matheson | A01M 29/10 119/713 |
| 6,575,597 B1 | * | 6/2003 | Cramer | F21V 33/0064 116/22 A |
| 6,681,714 B1 | | 1/2004 | Johnson | |
| 6,920,715 B2 | * | 7/2005 | Constantine | A01M 23/02 43/124 |
| 7,506,815 B2 | | 3/2009 | Spiegel | |
| 8,816,863 B2 | | 8/2014 | Arman | |
| 8,988,230 B2 | | 3/2015 | Nohara | |
| 9,414,581 B1 | | 8/2016 | Riesland | |
| 9,474,265 B2 | | 10/2016 | Duncan et al. | |
| 9,943,073 B2 | * | 4/2018 | Brugh | A01M 23/00 |
| 2002/0104254 A1 | | 8/2002 | Constantine | |
| 2003/0101634 A1 | | 6/2003 | Bhullar | |
| 2004/0083643 A1 | * | 5/2004 | Wu | A01M 29/32 43/134 |
| 2010/0201525 A1 | | 8/2010 | Bahat et al. | |
| 2011/0005146 A1 | * | 1/2011 | Ryan | A01M 29/32 52/101 |
| 2011/0144829 A1 | | 6/2011 | Kim et al. | |
| 2013/0014692 A1 | | 1/2013 | Lee | |
| 2013/0025544 A1 | | 1/2013 | Arman | |
| 2013/0081323 A1 | * | 4/2013 | Alfarhan | A01M 23/20 43/62 |
| 2014/0326195 A1 | * | 11/2014 | Gitrie | A01M 29/10 119/712 |
| 2015/0223171 A1 | | 8/2015 | Wang et al. | |
| 2015/0351330 A1 | * | 12/2015 | Toye | A45F 3/52 47/31 |
| 2016/0044910 A1 | | 2/2016 | Lang et al. | |
| 2016/0120137 A1 | * | 5/2016 | Toye | A01G 22/00 47/31 |
| 2016/0128315 A1 | * | 5/2016 | Henskes | A01M 29/10 119/713 |
| 2016/0183514 A1 | | 6/2016 | Dederick et al. | |
| 2017/0027156 A1 | | 2/2017 | Henskes et al. | |
| 2017/0238524 A1 | | 8/2017 | Brugh et al. | |
| 2017/0332607 A1 | * | 11/2017 | Tolley | B25G 1/04 |

FOREIGN PATENT DOCUMENTS

| | | | |
|---|---|---|---|
| CN | 104982416 A | | 10/2015 |
| CN | 206265306 U | | 6/2017 |
| DE | 102009005129 A1 | | 7/2010 |
| JP | 2000110229 A | * | 4/2000 |
| JP | 20152231711 A | | 12/2015 |
| KR | 10113757 B1 | | 2/2012 |
| KR | 101353948 B1 | | 1/2014 |
| KR | 20160051018 A | | 5/2016 |
| KR | 20160067351 A | | 6/2016 |
| WO | WO-0249427 A1 | | 6/2002 |
| WO | WO-2002049427 A1 | | 6/2002 |
| WO | WO-2005067378 A2 | | 7/2005 |
| WO | WO-2014085328 A1 | | 6/2014 |
| WO | WO-2019046786 A1 | | 3/2019 |

OTHER PUBLICATIONS

"ProHawk UAV", (accessed Sep. 15, 2017), 3 pgs.

Gray, Richard, "Meet robocrow: Machines shooting long-range laser beams to scare birds away replace scarecrows", (Dec. 8, 2014), 17 pgs.

"International Application Serial No. PCT/US2018/049209, International Search Report dated Nov. 21, 2018", 5 pgs.

"International Application Serial No. PCT/US2018/049209, Written Opinion dated Nov. 21, 2018", 8 pgs.

Bird Barrier, "Mist Net Kit Assembly and Use", Bird Barrier America, Inc., [Online] Retrieved from the internet on Dec. 5, 2018: <https://www.youtube.com/watch?list=PL77E709A23E0354A3&v=yHtYi-vUFXs>, (Aug. 29, 2014), 234 pgs; 3:52 min.

* cited by examiner

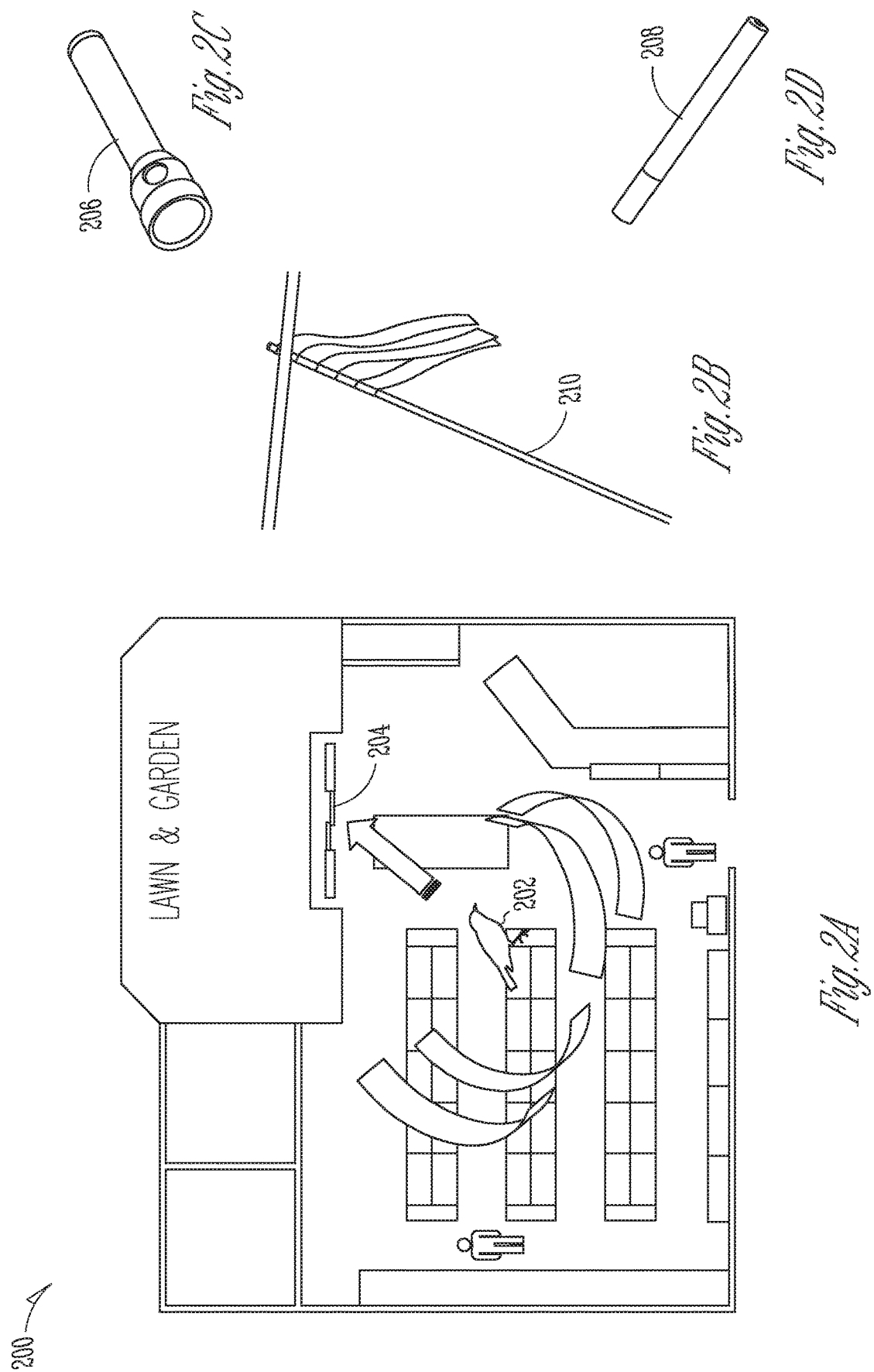

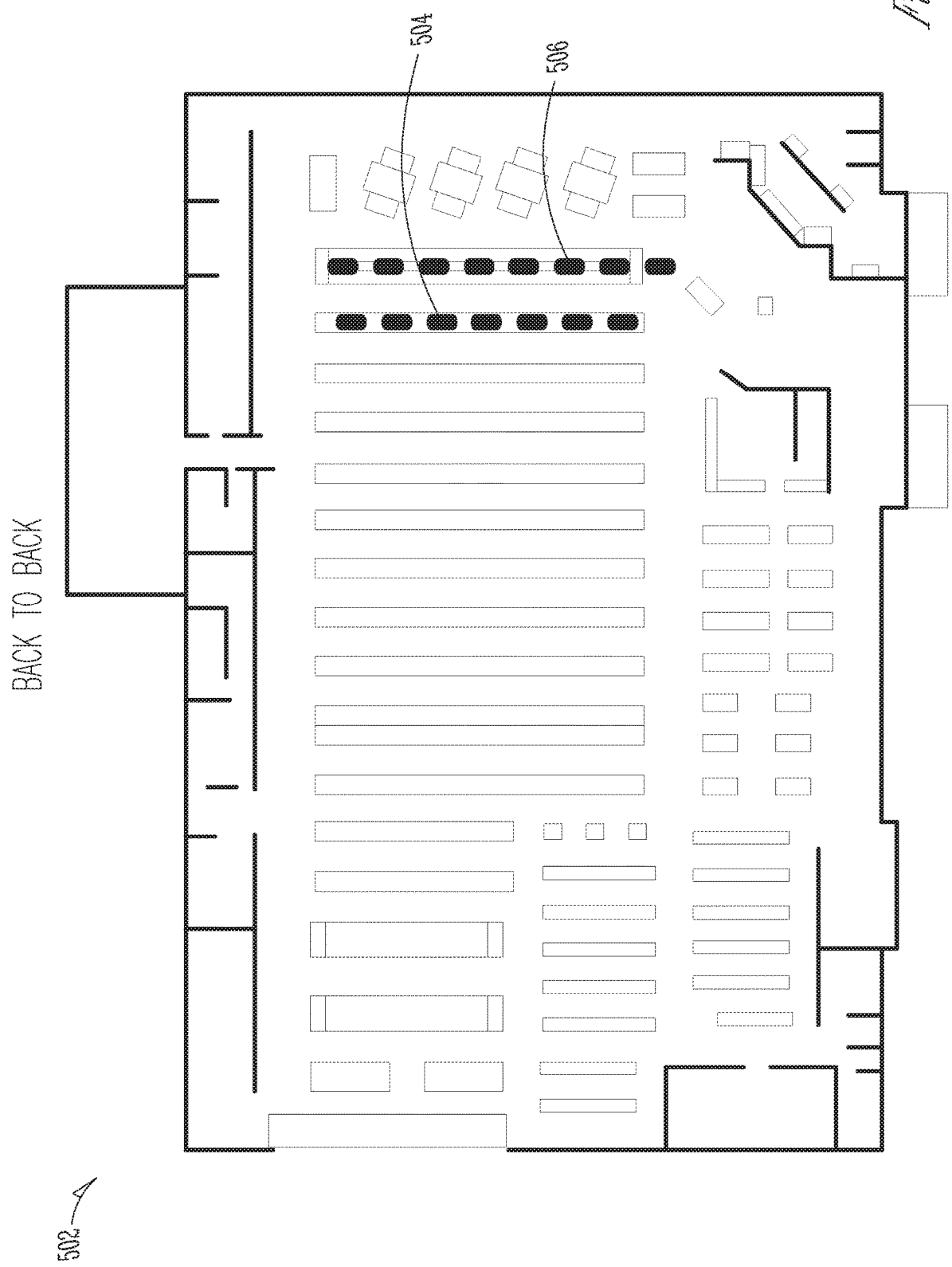

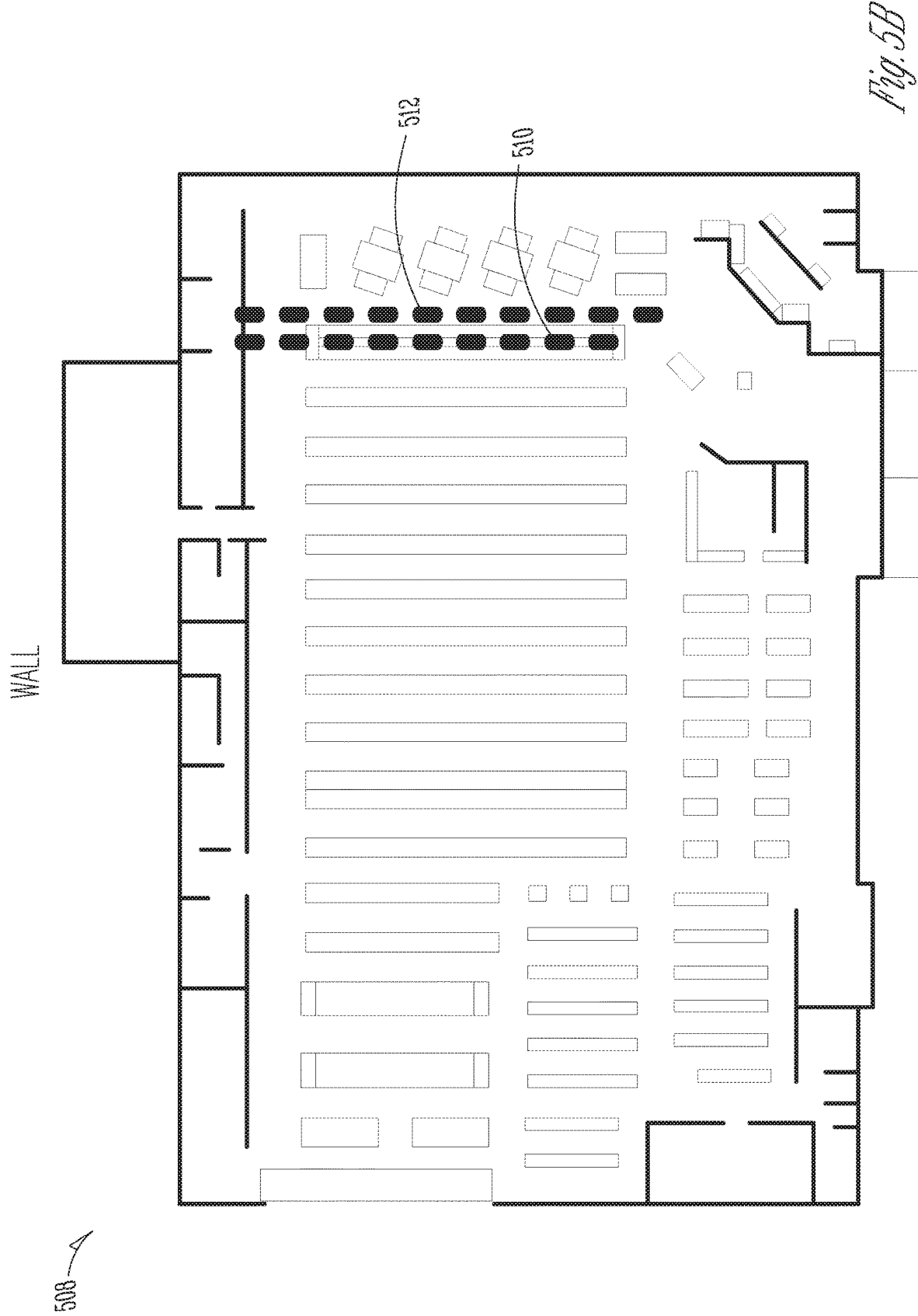

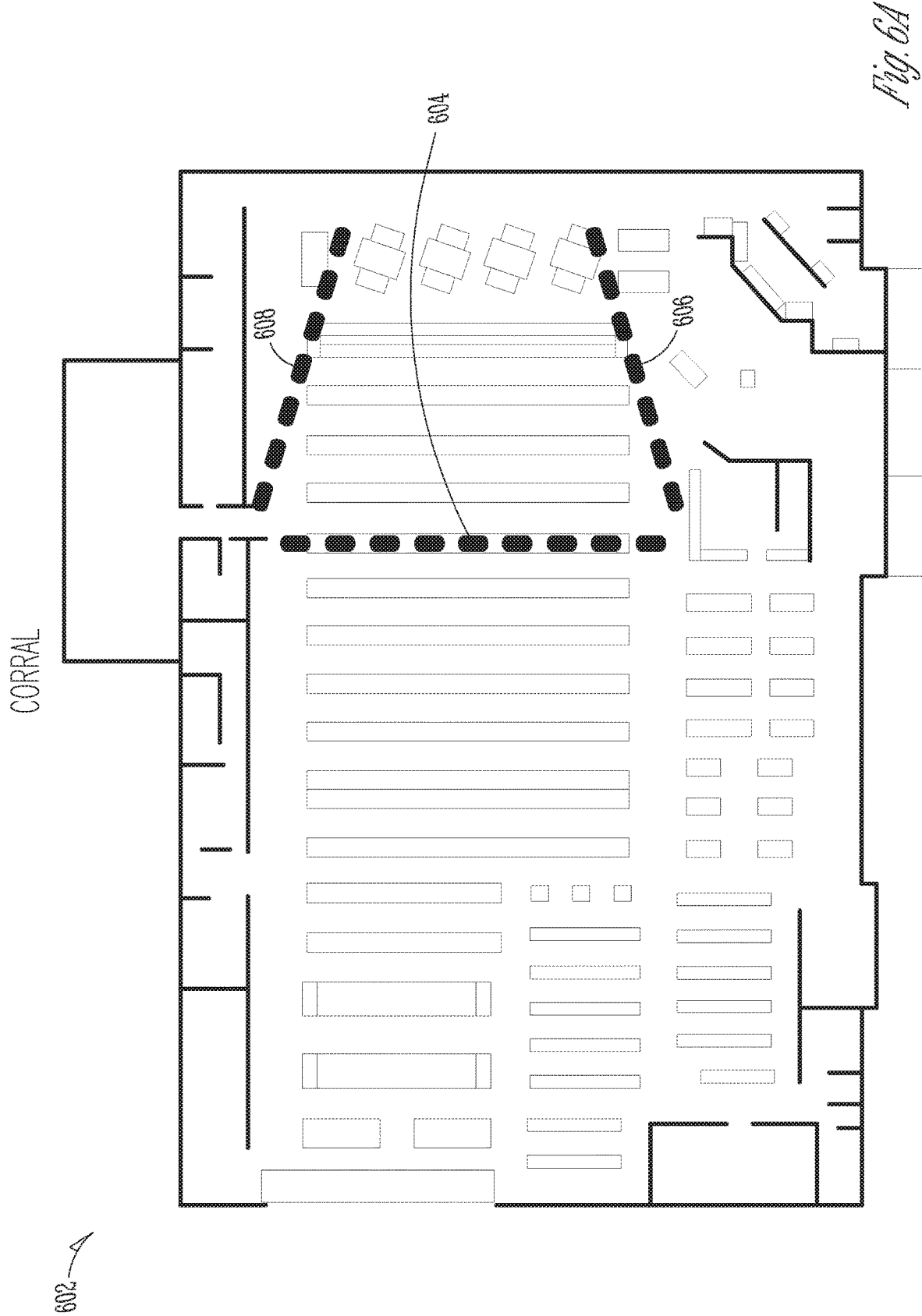

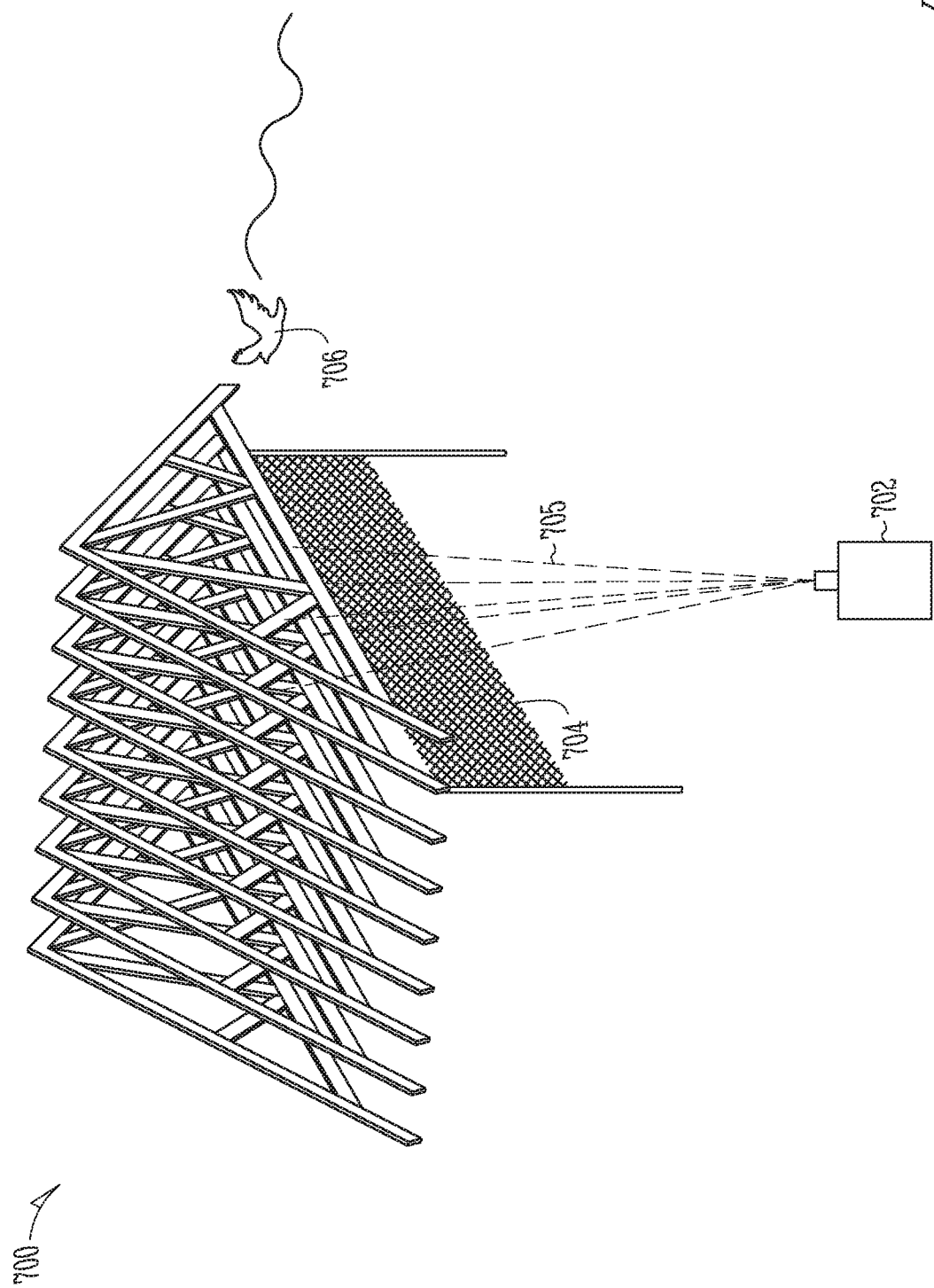

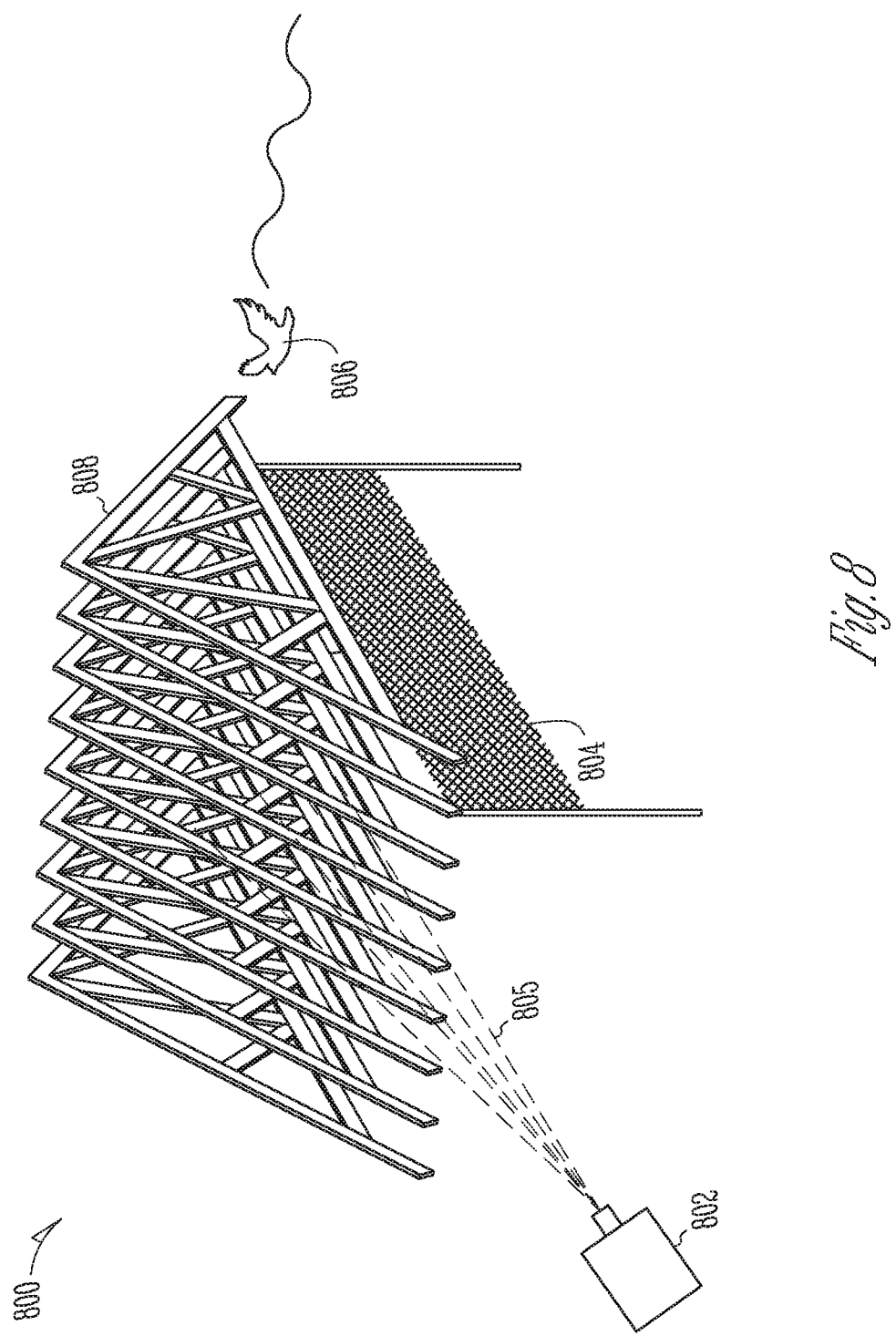

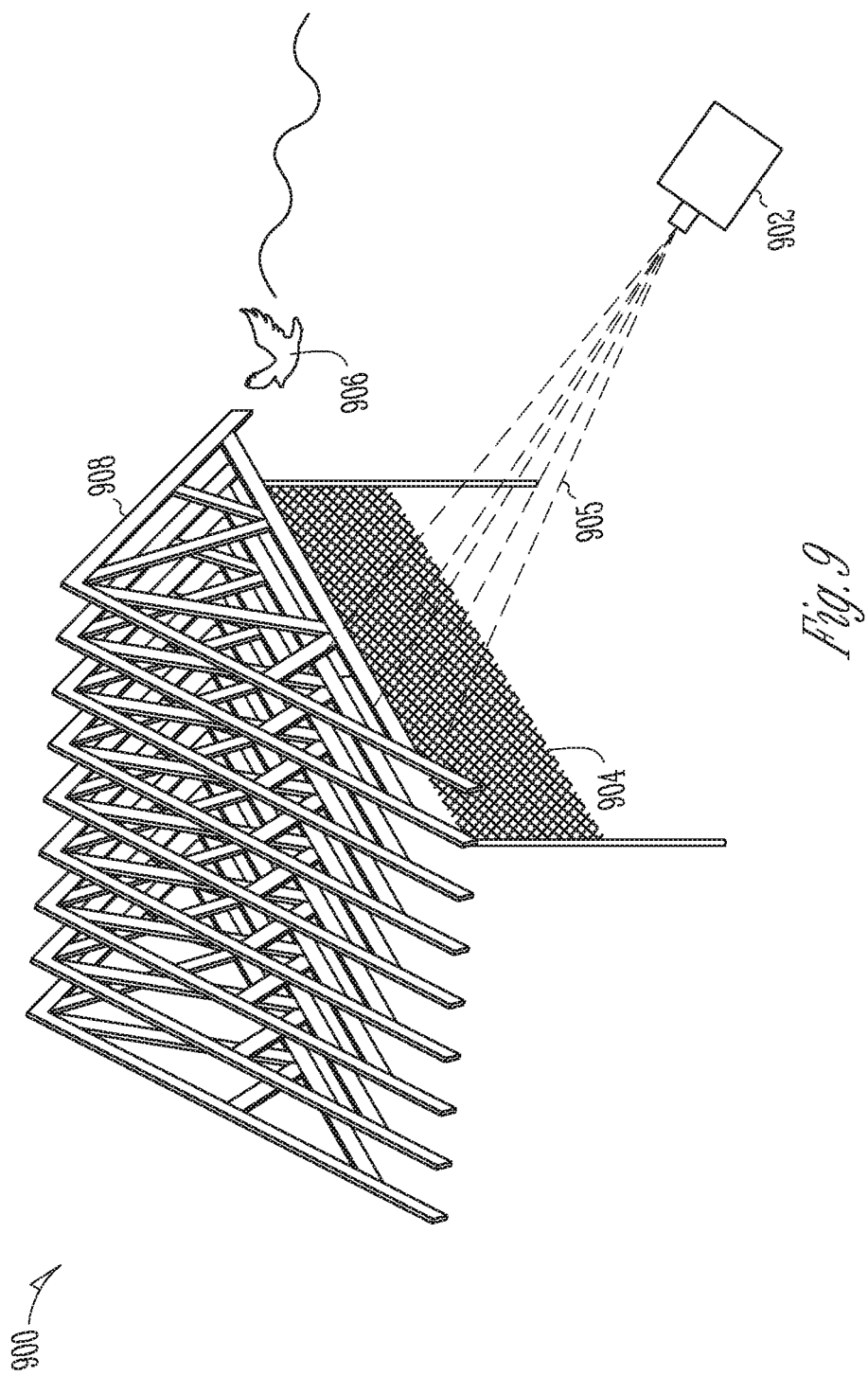

METHOD AND APPARATUS FOR BIRD CONTROL

CROSS-REFERENCE TO RELATED APPLICATION

This patent application claims the benefit of U.S. Provisional Patent Application No. 62/552,942, filed Aug. 31, 2017, entitled "METHOD AND APPARATUS FOR BIRD CONTROL", which is incorporated by reference herein in its entirety.

TECHNICAL FIELD

The present disclosure pertains to methods and apparatus for bird control in enclosures and other structures.

BACKGROUND

Birds can create serious problems for commercial and residential property inhabitants and owners. Uncontrolled, birds will roost or nest in or around man-made structures, such as in food retail and warehouse facilities. They can deface structures causing property and structural damage; create an unsanitary environment with droppings and nesting material; cause food contamination and loss of product; transmit diseases to humans and animals; carry ectoparasites which may bite humans or contaminate food; and cause economic loss due to the need to clean up after them and to repair damage; be a nuisance to employees, retail customers and production. Bird issues can result in damage to business reputation and the loss of business when merchandise and food items become littered with nesting debris and bird droppings, and can cause operations to shut down for pest bird removal, negatively impacting sales. Birds may remain and reproduce in the facility indefinitely if not properly eliminated.

Environmental concerns and local laws can sometimes require that birds be released unharmed, which is complicated by the fact that many times the birds must be captured at high or inconvenient or inaccessible locations to be removed.

There is a need in the art for bird control apparatus and methods which can solve at least some of the foregoing problems associated with unwanted birds.

BRIEF DESCRIPTION OF THE DRAWINGS

The present disclosure is illustrated by way of example and not limitation in the figures of the accompanying drawings, in which like references indicate similar elements and in which:

FIGS. 2A-D illustrate a flushing technique using tools such as a chasing rod, a flashlight, and a laser pointer, in accordance with some embodiments of the present subject matter, with FIG. 2A illustrating a bird in an enclosure such as a warehouse. FIG. 2B illustrating an example of the chase rod. FIG. 2C illustrating an example of the flashlight, and FIG. 2D illustrating an example of the laser pointer;

FIG. 5A illustrates a back to back pattern, in accordance with some embodiments of the present subject matter;

FIG. 5B illustrates a wall pattern, in accordance with some embodiments of the present subject matter;

FIG. 6A illustrates a corral pattern, in accordance with some embodiments of the present subject matter;

FIG. 7 illustrates a vertical laser system pointing up towards rafters, in accordance with some embodiments of the present subject matter;

FIG. 8 illustrates a laser system pointing at a side angle towards rafters, in accordance with some embodiments of the present subject matter; and FIG. 9 illustrates a laser system pointing in the direction of a ridge line of a building and towards rafters, in accordance with some embodiments of the present subject matter.

SUMMARY

Figure 1B:
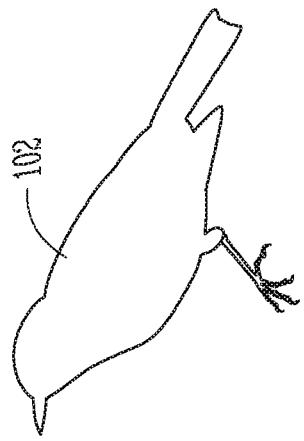
FIGS. 1A-D illustrate representations of examples of birds, with FIG. 1A illustrating a representation of a female house sparrow, FIG. 1B illustrating a representation a male house sparrow, FIG. 1C illustrating a representation a starling, and FIG. 1D illustrating a representation a pigeon.
Figure 1D:
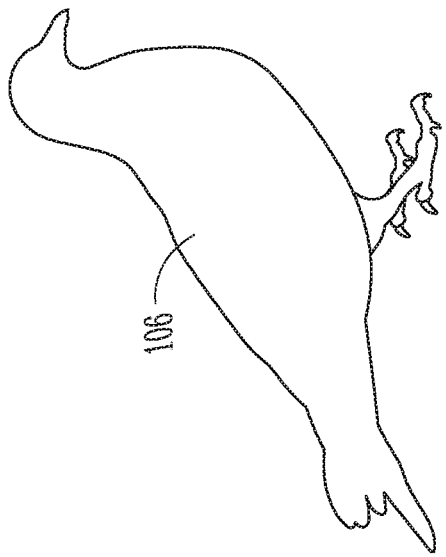
Figure 1A:
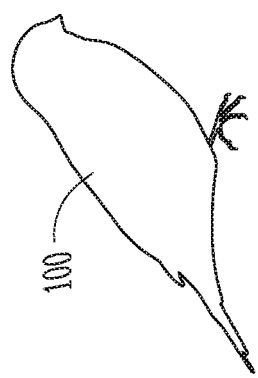
Figure 1C:
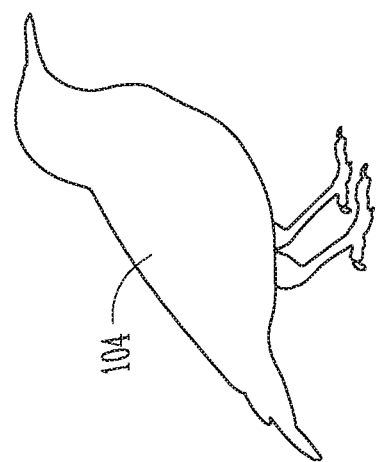

A system for control of birds in an enclosure, comprising one or more mist nets positioned in the enclosure; and a multi-projection laser system configured to produce a plurality of laser beams proximal to the net, wherein the one or more mist nets and laser system are configured to cause the birds to fly into the one or more mist nets for safe and humane removal of the birds from the enclosure. Variations of nets, lighting, and additional equipment to control birds is provided in various embodiments.

The system for bird control may include a mist net positioned under one or more rafters of the enclosure. It may further provide positioning the laser system under the mist net and pointing up toward the one or more rafters. In yet another embodiment, the laser system may point from the side of the one or more rafters and angle with respect to the rafters, such angling may occur at 45 degrees with respect to the rafter(s) and it may point along a ridge line of the rafter(s).

Configuration of a plurality of mist nets in the system may be configured in a 90 degree block pattern, in a back-to-back wall pattern, at staggered heights, and with varying lengths. A different configuration of a plurality of mist nets may be in a U-shape corral configuration or in a U-shape funnel configuration.

The system for bird control may also include sound devices to make sounds that initiate movement of a bird including sound devices imitate the call of a bird. The system may further employ traps, including bait. In a further embodiment, the system may include lights that are strobed or the multi-projection laser system may be strobed. In yet another embodiment, the system may include lights that are patterned and the multi-projection laser system may include patterned laser beams.

A method of corralling birds, comprising employing a multi-projection laser system configured to produce a plurality of laser beams proximal to the net employing mist nets in a configuration; and employing one or more mist nets configured to be positioned in the enclosure so as to catch the birds in the enclosure; wherein the one or more mist nets and laser system are configured to cause the birds to fly into the one or more mist nets for safe and humane removal of the birds from the enclosure. Variations of nets, lighting, and additional equipment to control birds is provided in various embodiments.

The method for bird control may include a mist net positioned under one or more rafters of the enclosure. It may further provide positioning the laser system under the mist net and pointing up toward the one or more rafters. In yet another embodiment, the laser system may point from the side of the one or more rafters and angle with respect to the rafters, such angling may occur at 45 degrees with respect to the rafter(s) and it may point along a ridge line of the rafter(s).

Configuration of a plurality of mist nets in the method of the invention may be configured in a 90 degree block pattern, in a back-to-back wall pattern, at staggered heights, and with varying lengths. A different configuration of a plurality of mist nets may be in a U-shape corral configuration or in a U-shape funnel configuration.

The method for bird control may also include sound devices to make sounds that initiate movement of a bird including sound devices imitate the call of a bird. The method may further employ traps, including bait. In a further embodiment, the method may include lights that are strobed or the multi-projection laser system may be strobed. In yet another embodiment, the method may include lights that are patterned and the multi-projection laser system may include patterned laser beams.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter provides devices, systems and methods for unique techniques for bird control. In various embodiments, pest birds, such as sparrows, are corralled into nets for removal and relocation. Lasers can be utilized to change bird flight patterns, flush birds into mist nets for safe removal and to discourage their movement to refuge locations such as ceiling rafters.

Some embodiments include customized mist-net equipment that can allow service providers to perform services to remove indoor birds without having to use lifts or ladders; while keeping their feet on the ground for safety purposes.

It is valuable to understand local laws and regulations concerning birds in your area before implementing bird control. It can be beneficial to check local, state, or federal laws that might prohibit bird control or require special licensing/certification. In the event a protected species enters a building, it may be necessary to contact the local U.S. Fish and Wildlife Services or Department of Natural Resources. The birds generally not protected by federal or state laws are depicted in FIGS. 1A-D: Feral Pigeons (*Columbia livia*) 106 (FIG. 1D), European Starlings (*Sturmis vulgaris*) 104 (FIG. 1C), and House Sparrows (*Passer domesticus*), such as female house sparrow 100 (FIG. 1A) and male house sparrow 102 (FIG. 1B).

Removal of pest birds from large facilities may be a time-consuming endeavor. The conditions of the facility generally favor the birds and this can dramatically affect bird removal success. Such conditions include one or more of:

The quantity of birds within the facility may affect service time; in general, more birds take more time, especially when they learn that they are being pursued.

Service during hours of operation, customer levels and product restocking may restrict the success of bird removal.

Open beam opportunities which provide for hiding and perching.

Palletized merchandise within the store construction may provide additional hiding places.

Loading dock and automatic doors may allow birds to freely enter and exit the facility.

Threatening sights and sounds may cause birds to quickly vanish within the facility.

Failed capture attempts may lead to future avoidance of control strategies.

Birds may not show interest in baited traps if established food and water sites are still available.

The length of time that the birds have been in the facility and become acclimated.

Bird activity inside a facility includes three general categories: Birds feeding inside a building, birds accidentally trapped inside a building, or birds roosting inside a building. Each of these categories presents challenges and will be considered separately.

Category 1—Birds Feeding Inside a Building:

In this category, one or more birds enter to feed and/or loaf during the day. These birds do not stay overnight, but leave and roost outside the building. Likely places where this behavior occurs is in tire centers, garden centers, and loading docks that may either be open or have open doors for some period of the day. This situation can lead to harassed customers and damaged merchandise.

Category 2—Birds Accidentally Trapped Inside a Building:

In this category, one or more birds have found their way into a building but have not established a roost or a food source. This situation can be characterized by a bird flying in an un-patterned fashion and/or frequently visiting sky lights in an attempt to find a way out of the building. An example of this situation would be a bird that has entered a store on a grocery-type cart that has never been in the facility in the past. Birds that find their way into buildings and can't leave can be a special situation. These birds are generally looking to leave the building. If handled early, the bird may be able to be flushed out and/or removed quickly and easily.

Category 3—Birds Roosting (Established) Inside a Building:

In this category, birds roost in a building and typically do not leave. The birds may have a nest and a source of food and water. This situation can result in a long-term interior bird infestation. This situation is any bird that lives in a building and does not leave the building. Nests will be made of materials found inside the store. The bird may not be flushed out and/or removed easily and traps and/or mist nets should be considered.

The present subject matter offers a combination of bird control measures which can be used together to control bird populations in buildings and structures.

Bird Trapping—

One option for bird control is to remove indoor birds using traps, such as box traps. Box traps are a form of live trap for birds and other animals which employ a trap door that is triggered by the animal to be trapped within an enclosure. In the case of birds, the box traps can be baited with food and/or nesting material. When attempting to get the food or nesting material, the bird sets off a trap door which encloses the bird in the enclosure. Box traps often use a spring-loaded door that is set in an open state to allow a bird access to the box and its contents. The trap door is triggered by the bird, and encloses the bird in an enclosure. The enclosure can be made of wire screen or solid material, such as wood or plastic. A trapped bird can be removed from the area in which it was trapped, and the door can be opened to release the bird to the wild. Box traps may use an audible module to provide bird calls which attract a particular species of bird and no other pest bird species. For example, an audible module can be used to call out to sparrows and thereby attract them and not other species. Examples of audible modules and box traps include those sold by various manufacturers, such as the Sparrow Call Module for the Sparrow Trap Door from Bird Barrier (www.birdbarrier.com).

Box traps can be baited with a piece of bread, donut, or other bait, and can be placed on a solid surface or hung near where birds are known to congregate and within their line of sight. The box trap should be placed out of reach of pets and children. After a bird is captured if the lid is not lifted the bird will remain calm inside trap and will not escape. The trap can be taken outdoors, and in some cases a minimum of 10 miles from the property, and the bird can be released by opening the lid or bottom cleanout panel.

Another option for bird control is the use of cage wire traps. A cage wire trap is a wire enclosure fitted with a spring door that is triggered shut by an animal. The resulting enclosure allows the animal to be live-trapped for removal. In the case of trapping birds, the cage wire trap can be baited with food or nesting material or other objects of interest to a bird. Upon inspection of the bait, the trap door is triggered and closes on the animal. Other baits can be used, such as other birds. For example, a sparrow trap door can be turned into a repeating trap. A first sparrow is caught and falls inside the cage trap. Once inside it sings and attracts other birds. The trap door secures to the top of the cage trap with spring clips. It can be hung from the ceiling with provided cable bridle. Two "draw bridge" style patios provide safe entrance for birds and can be hinged up for transport. The inner chamber can be stocked with food and water. A sanitary metal slide-out pan keeps all food and droppings inside the trap. The trap can be easily removed by unlatching the spring clips from the slots and sliding the trap forward while closing the top of the cage to eliminate the possibility of any birds escaping.

Flush or Scare Indoor Birds Out (Visual and Sound Devices)

Normally, flushing is most effectively done shortly after birds have come inside and before they become acclimated and have established roost sites or food sources. This is typically within 36 to 72 hours of entering an enclosure, such as a warehouse. Steps can include one or more of the following:

Identify possible entry points. Also determine if there are any simple exit points.

If possible, turn interior lights off or down except near exit points.

FIG. 2A-D illustrate a flushing technique 200 in accordance with some embodiments. Scare tactics may be used to force or herd a bird 202 in an enclosure (FIG. 2A), such as a warehouse, to an open window, door 204 or open skylight. Good options for directing birds are strobe flashlight 206 (FIG. 2C), a laser pointer 208 (FIG. 2D) or flash tape on a chase pole 210 (FIG. 2B). Care should be taken not to scare the bird into hiding. To initiate movement of the bird, sound harassment (e.g. tapping metal racking) near bird can be effective.

In some embodiments, flushing is a team activity and found to be more efficient and effective as a team activity, possibly also utilizing store employees to herd or direct birds to exit points.

In some embodiments, a person will position themselves to herd the birds to the targeted exit area (e.g. a "funnel model").

Any of the above tactics can also be used in combination with mist nets, such as is described herein.

Mist Nets

Mist nets are extremely fine nets that can be placed across the flight paths of birds. Birds generally do not see the nets in flight, hit them, and become entangled in the loose netting. Mist netting is most effective when multiple nets are placed to reduce the population down quickly.

In some embodiments, mist nets are rectangular in shape and available in various sizes and colors, and may be deployed using different methods. A typical rectangular size net can be 8 feet by 40 feet. Other shapes may be used without departing from the present subject matter. In various embodiments, nets employ a single color. For example, nets may be black, white, or any desired color. In various embodiments, nets can be multicolored. Examples of multicolored nets include nets that are camouflaged and or nets designed to substantially match or fit in a background. In some embodiments, the colors and length are varied to achieve an effect. For example, net colors and lengths can be varied to simulate a tunnel or other corralling or herding structure. In various embodiments, the nets have a fine nylon mesh and a plurality of strings to be tied to objects, including but not limited to rafters, girders, or beams. In various embodiments, the net is tethered, and has a very fine nylon mesh and a plurality of shelf strings. Shelf strings include cords, strings, twine, or any kind of relatively sturdy string capable of supporting the weight of the net. Such strings are often run the length of the net to support the net. In various embodiments, the plurality of shelf strings are nylon strings; however, it is understood that other types of strings may be used. In some embodiments, three or four shelf strings are used; however, it is understood that other numbers of strings may be used. In some embodiments, mesh sizes vary and ¾ inch mesh is recommended for capturing sparrows 100, 102 and starlings 104; however, it is understood that other meshes may be used. In various embodiments, the net may include tethers on the corners and four shelf strings that run horizontal through the net. These thicker strands can be looped at each end and can be used to tie nets to poles or other objects. In some embodiments, the mist nets are reusable. Store nets can be folded in baskets or resealable bags, or rolled in sheeting (e.g., plastic sheeting or butcher paper), rolled onto the poles, stored in a case or inside a four inch PVC pipe, or combinations of these things. If using PVC secure an end cap on one side and use a threaded cap on the other. Such approaches allow the net to be stored to avoid tangles and to enhance the ease and speed of deploying the net without tangles or complicated deployments. For example, such designs may provide for deployment of the net by separating the poles, thereby pulling the net from the bag, plastic sheeting, butcher paper, basket or other means for storing the net between uses. It is understood that other storage techniques may be applied and may be combined with the ones stated herein.

Figure 3:
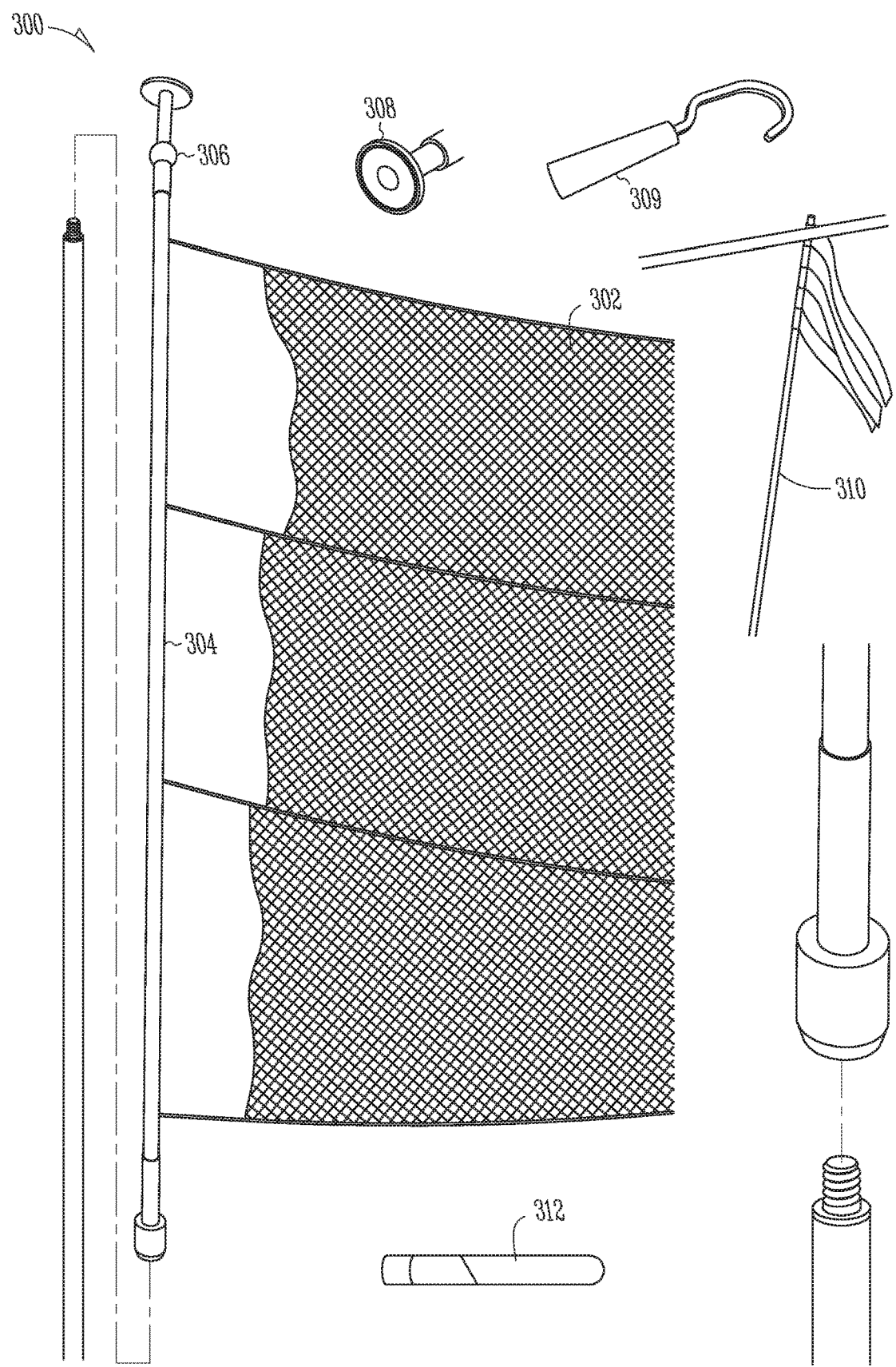
FIG. 3 illustrates a mist net system, in accordance with some embodiments of the present subject matter.

FIG. 3 illustrates a mist net system 300, in accordance with some embodiments. In some embodiments, a mist net system 300 includes mist nets 302, an extension pole set 304, removable pole top extensions 306, magnet 308, hook attachments 309, a chase pole 310, a laser pointer 312, and a discrete carrying case and instructions. As shown in FIG. 3, the extension pole set 304 can be long enough to hang the mist net 302 to a ceiling or rafter and allow a user to remain standing on the ground. The magnet 308, or the hook attachment 309 can provide the top of the extension pole set 304 with varied attachment devices to variable structures and surfaces.

Exemplary Procedures to Hang Mist Nets

In some embodiments, mist nets are handled using a two person team. The team can remove plastic wrapper from net and remove the cord that is bundling the net together. A person may unfold the net. When the loops at the end of the net are exposed, each person can hold one set of loops and unfold the net. In some embodiments, the loops create pockets that are called "shelves." The shelves are what capture the bird on contact. In various embodiments, the top loops are white. Each loop may be attached to the mist net hanging system without tangling the net.

In some embodiments, a building or structure or are is surveyed to identify the most likely flight paths of the bird(s). In some cases birds fly between perches and food sources several times per day. If nets are placed in the way of likely flight paths, then the probability of capture is increased. Once flight paths have been identified, place nets along the routes. In some embodiments, the net or nets should be placed such that the bird will fly straight into the net (not at an angle).

In some embodiments, the net is positioned so it hangs horizontally and perpendicular to the bird's preferred flight path. It can be beneficial to choose an area where heat and A/C units will not blow on the net. When there are several birds, it may be best to use multiple nets. Leading birds will generally get caught but the lagging birds may see those caught and veer away. Thus, in some embodiments, it can be beneficial to mount side nets to catch those trying to avoid the primary capture net. A Sparrow Caller Audio Module may be positioned near the net to draw birds to the mist nets.

Figure 4A:
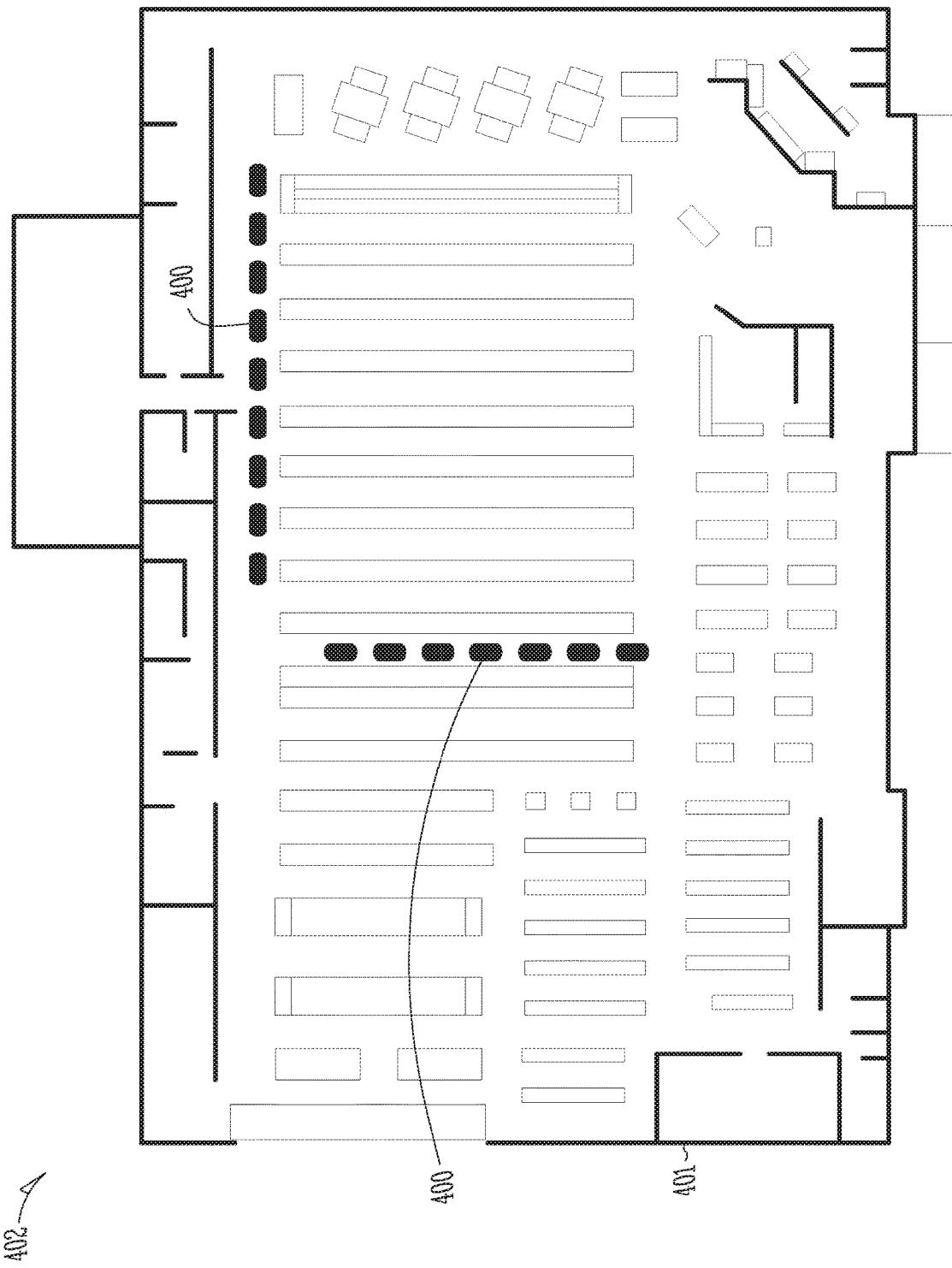
FIGS. 4A-B illustrate a 90 degree block pattern, in accordance with some embodiments of the present subject matter.
Figure 4B:
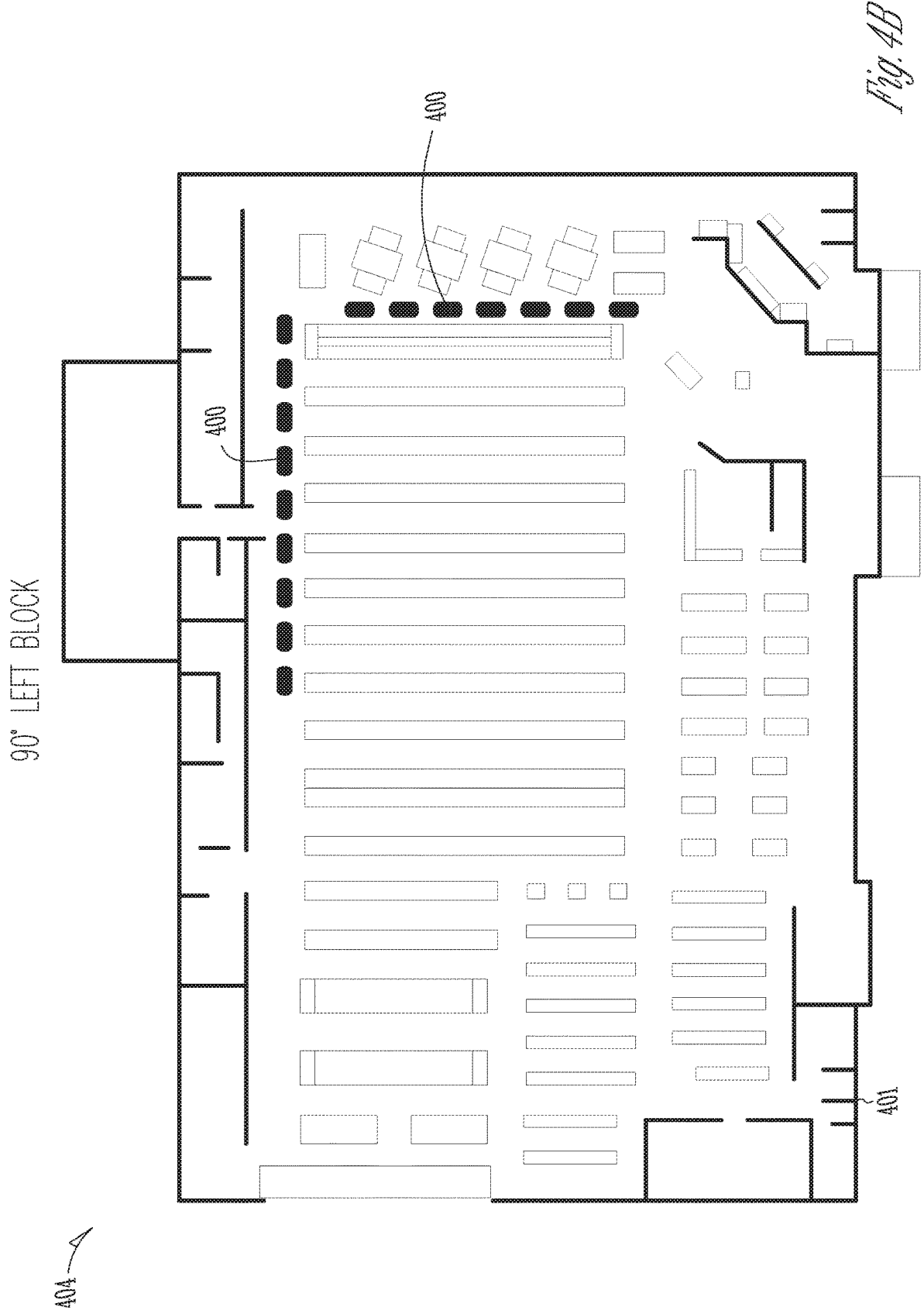

In some embodiments, the nets can be mounted in one or more of the shaped patterns demonstrated by FIGS. 4-6. FIGS. 4A-4B illustrate a 90 degree block pattern in accordance with some embodiments of the present subject matter. Mist nets 400 can be located in a building 401 positioned in a right block pattern 402 shown in FIG. 4A or a left block pattern 404 as shown in FIG. 4B. Two nets positioned at right angles to block and capture birds that have a defined flight pattern to a specific point. In some embodiments, this could be a location where their flight pattern is near to a food or water source in the immediate area. Note that the right angles of the nets can be closely positioned to restrict the bird's flight and escape points.

FIG. 5A illustrates a back to back pattern 502 in accordance with some embodiments. In some embodiments, a back net 506 is positioned parallel behind another front net 504 at staggered heights to trap birds flying above or below the front net 504. It can be beneficial to consider where birds are observed flying under or over the mist nets. In some embodiments, different lengths are used with the longer net at the 2nd level behind the front net 504.

FIG. 5B illustrates a wall pattern 508 in accordance with some embodiments of the present subject matter. In various embodiments, two nets are positioned to create a higher vertical wall with bottom edge of upper net 510 on top of an upper edge of a lower net 512. This approach can improve bird catch over using a single net. In some embodiments, the wall pattern 508 reduces opportunities for birds to fly over or under especially where net positioned over obstacles below (e.g. racking, boxes, etc.).

FIG. 6A illustrates a corral pattern 602 in accordance with some embodiments of the present subject matter. In some embodiments, three nets 604, 606, and 608 are positioned in U-shape to confine the bird to a specific area such as a Lawn and Garden section of a retail establishment. The nets 604, 606, and 608 should be placed (staged) on the floor prior to harassing the bird to the netting zone. This blocks the bird from moving back to the retail floor. Birds that attempted to veer to left or right become trapped in corral net pattern.

Figure 6B:
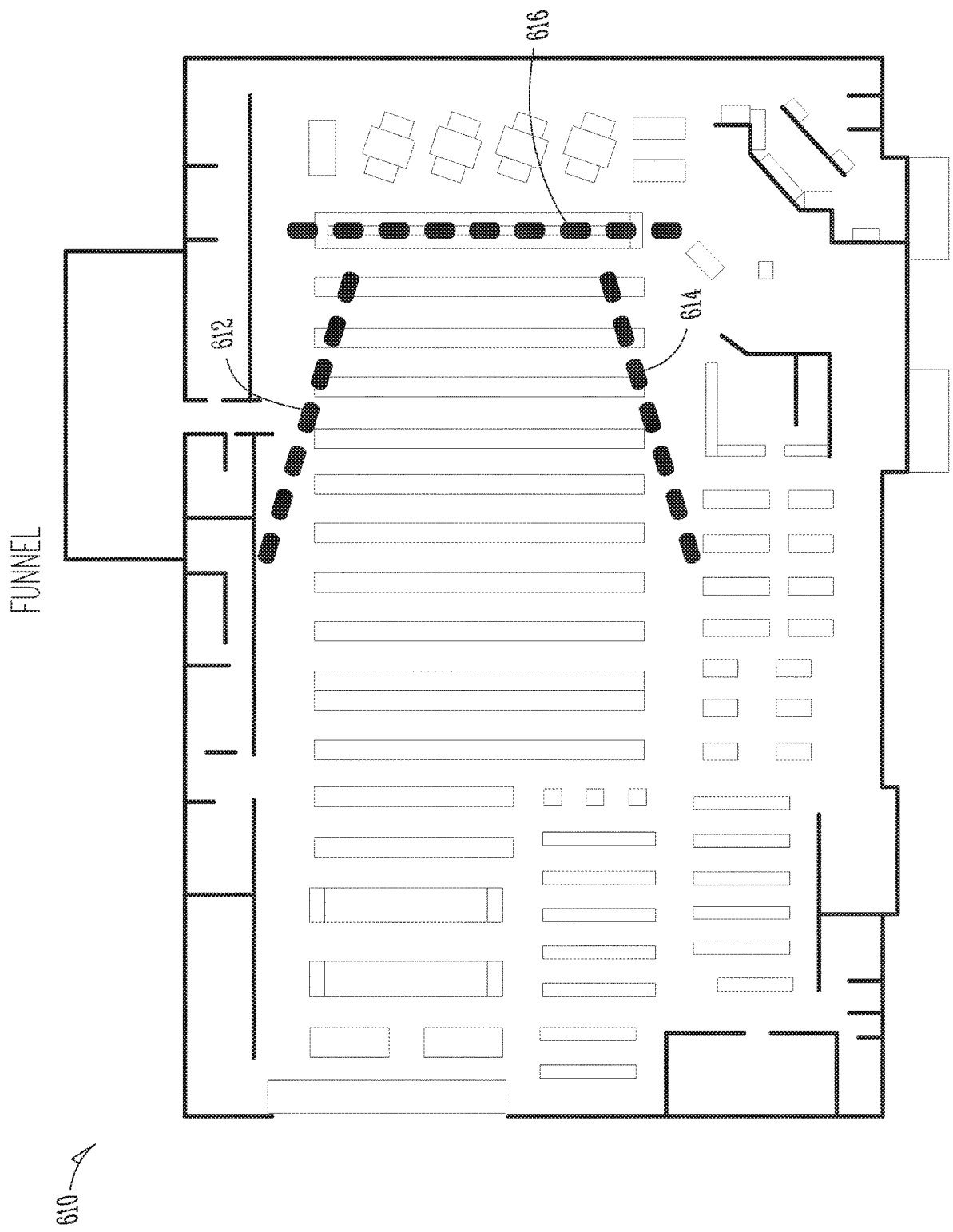
FIG. 6B illustrates a funnel pattern, in accordance with some embodiments of the present subject matter.

FIG. 6B illustrates a funnel pattern 610 in accordance with some embodiments of the present subject matter. In some embodiments, three nets 612, 614, and 616 are positioned in a "U-shape" to channel or funnel birds to a central net. It can be beneficial to use different lengths with the two longer nets used on the sides to limit the escape route of the birds. Birds that attempted to veer to left or right become trapped in net. In some embodiments, the funnel pattern 610 is used for wide areas or where birds are observed flying inconsistently to the left or right of net.

In some embodiments, lasers are used to affect bird flight patterns. The use of lasers, particularly multi-laser projectors (e.g., models micro Star and Micro Glaxian II by ADJ Products, LLC®, model EZ Laser RGFX by Chauvet® DJ), which can produce between one to thousands of laser beams of one or more colors to corral birds into mist nets and deter movement to unwanted locations such as ceiling rafters. In some embodiments, multi-laser projectors or any type of laser system can be used in combination with any of the mist net positioning patterns described in FIGS. 4-6 above.

Rafters can present difficult bird trapping situations. FIGS. 7-9 illustrate various examples of laser positioning and directing in relation to bird flight patterns and rafter locations. FIG. 7 illustrates a vertical laser placement example 700, in accordance with some embodiments of the present subject matter wherein a laser unit 702 is placed directly under a mist net 704 and under rafters of an enclosure. Laser beams 705 are directed up towards the net 704. The bird flight is shown at 706. The laser unit 702 can be a multi-laser projector system and can produce a plurality of colored laser beams. In an example, the laser unit 702 can produce both red and green laser beams. In an example, the laser unit 702 can produce more than 200 laser beams. Upon reading and understanding the present disclosure, a person of skill in the art would understand that other colors and number of beams may be employed in such applications.

FIG. 8 illustrates a bird laser placement example 800 where the laser system is angled from the side of the rafters, in accordance with some embodiments of the present subject matter. A laser unit 802 is placed such that the laser beams 805 are directed at an angle towards rafters 808 (e.g. or other ceiling structures). The net 804 may be located to catch birds flying under the rafters as shown. The bird flight direction is shown at 806 and in some cases can be towards the laser beams 805. In various embodiments, the laser unit 802 directs the beams at a 45 degree angle in relation to horizontal. Other angles can be used as well.

FIG. 9 illustrates a laser system pointing towards rafters (along a ridge line) and along a path of flight of birds 900, in accordance with some embodiments of the present subject matter. A laser unit 902 can be placed such that the laser beams 905 are directed at an angle towards rafters 908 (e.g. or other ceiling structures). The net 904 can be located as shown. The bird flight direction is shown at 906 and in some embodiments can be away from the laser beams 905. In various embodiments, the laser unit 902 directs the beams at a 45 degree angle in relation to horizontal. Other angles can be used as well.

A survey of the enclosure or facility and surroundings can be conducted. A form can be used to record a diagram of the enclosure or facility and to document findings during the survey. Care should be taken to identify the species to be controlled in order to be certain that you will not harm a protected bird. In various embodiments and combinations, the survey can start from the outside of the facility and work into the enclosure. Exterior evidence of bird activity can be recorded. For example, entries can describe bird nests and nesting areas, roosting areas, loafing areas, available water sources (e.g., sprinklers, air conditioning, puddles, etc.), available food, accumulations of bird droppings, flight paths and movements around the general area, and evidence of birds using adjacent facilities for food/harborage, access points, bird activity, and combinations of them. An excluded zone of a facility can be investigated for potential bird access points, looking high and low. Likely entrance points may be recorded on the diagram.

Inspections can be conducted on the interior of the enclosure or facility and the following can be recorded: bird nests, bird roosting areas, bird loafing areas, available water, available food, accumulated bird droppings, flight patterns, bird population/count, and combinations of them.

In various embodiments, the method includes one or more of meeting with personnel or other persons of the enclosure or facility to review findings and generate recommendations. The findings may include one or more of, bird pressure on the outside of the facility, a review of how birds are likely entering a facility, activity of birds in the building, locations of likely bird loafing areas. A risk reward or cost analysis can be provided which takes into consideration one or more of reducing exterior pressure, excluding birds from getting into the facility, removing resident birds from the facility. A level of service may be selected, and or varied, for the task at hand.

Bird control may include complex and integrated programs using an escalating treatment strategy and resident input and partnership to resolve the issue. The bird service strategy utilizes products and equipment to relocate pest birds as quickly and discreetly as possible. A successful indoor bird control program consists of an outside-multi-level integrated approach.

For example, a first level may involve removal of indoor birds. Box traps and cage wire traps can be employed and emptied outside to rid the facility of birds. It can be applied to birds of category 1, 2 or 3.

A second level approach may be to flush or scare birds out of the enclosure or facility. Visual and sound devices can be employed. In various embodiments, lights, lasers, sounds, poles and other devices can be employed to scare indoor birds outside. In various embodiments, strobed light sources may be employed. Combinations of strobed light sources include indoor lighting, lasers, multiple beam laser systems, multiple color light devices, and multiple pattern light devices. This level two approach can be effective at flushing or scaring newly introduced birds out of the facility.

In a third level, mist nets can be installed which trap flying birds as birds fly about the internal building or facility. Mist net kits can be obtained and deployed. The mist nets can have varying lengths, shapes, colors, and be hung differently or in a pattern to improve chances of capture of the pest birds.

In a fourth level, for example, situation assessment can be assigned in used to harvest.

In a fifth level, for example, the structure or its neighboring environment is modified to limit birds' attraction to the structure. This can be done by removing or limiting food sources and water sources from the area. It may also involve removing nests and nesting materials from the area, removing or limiting roosting and nesting sites from the area, and/or reducing exterior pressure by utilizing anti-perching systems and bird exclusion tools. Tools that may be used include but are not limited to gels, spikes, electric shock track, rotating wires, coil, post and wire, bird slide and netting. It may also involve repelling birds from the structure, e.g., using visual and sound devices as repellants. It may be advantageous to install devices to repel birds, including optical, audible and chemical deterrents. It may also be beneficial to restrict bird entry into the structure ("bird proofing/exclusion"). The best tools and methods of exclusion can be utilized for the situation and to address entry points e.g. open doors, damaged dock plates and pads. It may be beneficial to reduce sensitivity of sensors on exterior speed doors so birds cannot activate openers. This can be done using, but not limited to, plastic strip, curtains, foam, exclusion netting, and combinations of them.

The foregoing levels are intended to demonstrate a multi-level approach to control of birds; however, it is understood by a person of ordinary skill in the art that other levels having different activities may be performed without departing from the scope of the present subject matter.

EXAMPLES

The present subject matter provides examples of a system for control of birds in an enclosure, comprising one or more mist nets positioned in the enclosure; and a multi-projection laser system configured to produce a plurality of laser beams proximal to the net, wherein the one or more mist nets and laser system are configured to cause the birds to fly into the one or more mist nets for safe and humane removal of the birds from the enclosure. The present subject matter includes examples of a system for control of birds in an enclosure, comprising capture means for capturing birds in flight, including attachment means for attaching and positioning the capture means in the enclosure; and light projection means for producing a plurality of laser beams, wherein the light projection means is configured with the capture means to produce light that cause the birds to fly into the capture means for safe and humane removal of the birds from the enclosure. In some examples the attachment means includes shelf strings. In some examples the capture means includes one or more nets. In some examples, the light projection means includes a multi-projection laser system.

Variations of nets, lighting, and additional equipment to control birds is provided in various embodiments. For example, the preceding system can be used wherein a mist net of the one or more mist nets is positioned under one or more rafters of the enclosure. In another example, the laser system is positioned under the mist net and pointing up toward the one or more rafters. In yet another example, the laser system is pointed from the side of the one or more rafters and is angled with respect to the one or more rafters. In another example, the laser system is angled at 45 degrees with respect to one or more rafters. In yet another example, the laser system is pointed along a ridge line of the one or more rafters. For example, the laser system is angled with respect to the ridge line of the one or more rafters. In yet another example, the laser system is angled at 45 degrees with respect to the ridge line of one or more rafters.

In any of the various foregoing examples the system may include a plurality of mist nets configured in a 90 degree block pattern. In any of the various foregoing examples the system may include a plurality of mist nets configured in a back-to-back wall pattern. In any of the various foregoing examples the system may include a plurality of mist nets in a U-shape corral configuration. In any of the various foregoing examples the system may include a plurality of mist nets in a U-shape funnel configuration.

In any of the various foregoing examples the system may include the mist nets configured with staggered heights. In any of the various foregoing examples the system may include the mist nets configured with varying lengths. In any of the various foregoing examples the system may include mist nets that are configured with staggered heights and varying lengths.

In any of the various foregoing examples the system may include sound devices to make sounds that initiate movement of a bird. In any of the various foregoing examples the system may include sound devices to make sounds that imitate the call of a bird.

In any of the various foregoing examples the system may include traps or baited traps, or traps with nesting material in them.

In any of the various foregoing examples the system may include lights that are strobed. In any of the various foregoing examples the system may include wherein the multi-projection laser system is strobed. In any of the various foregoing examples the system may include wherein lights that are patterned. In any of the various foregoing examples the system may include wherein the multi-projection laser system provides patterned laser beams.

The present subject matter provides examples of methods of corralling birds, comprising employing a multi-projection laser system configured to produce a plurality of laser beams proximal to the net employing mist nets in a configuration; and employing one or more mist nets configured to be positioned in the enclosure so as to catch the birds in the enclosure; wherein the one or more mist nets and laser system are configured to cause the birds to fly into the one or more mist nets for safe and humane removal of the birds from the enclosure. Variations of nets, lighting, and additional equipment to control birds are provided in various examples. In any of the various foregoing examples the method may include using sound devices to make sounds that initiate movement of a bird. In any of the various foregoing examples the method may include using sound devices to make sounds that imitate the call of a bird. In any of the various foregoing examples the method may include using traps to trap birds in an enclosure. In any of the various foregoing examples the method may include using traps that are baited traps.

The foregoing examples are not limiting or exclusive, and the scope of the present subject matter is to be determined by the specification as a whole, including the claims and drawings.

The above description includes references to the accompanying drawings, which form a part of the detailed description. The drawings show, by way of illustration, varying embodiments in which the invention can be practiced. The application also refers to "examples." Such examples can include elements in addition to those shown or described. The foregoing examples are not intended to be an exhaustive or exclusive list of examples and variations of the present subject matter.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description.

The scope of the invention should be determined with reference to the appended claims, along with the full scope of equivalents to which such claims are entitled.

What is claimed is:

1. A system for control of birds in an enclosure, comprising:
   one or more mist nets positioned in the enclosure; and
   a multi-projection laser system configured to produce a plurality of laser beams that impinge on a portion of the enclosure proximal to the one or more mist nets,
   wherein the one or more mist nets and the laser system are arranged for the plurality of laser beams to cause the birds to fly into the one or more mist nets for safe and humane removal of the birds from the enclosure.

2. The system of claim 1, wherein a mist net of the one or more mist nets is positioned under one or more rafters of the enclosure.

3. The system of claim 2, wherein the laser system is positioned under the mist net and pointing up toward the one or more rafters.

4. The system of claim 2, wherein the laser system is pointed from the side of the one or more rafters and is angled with respect to the one or more rafters.

5. The system of claim 4, wherein the laser system is angled at 45 degrees with respect to one or more rafters.

6. The system of claim 2, wherein the laser system is pointed along a ridge line of the one or more rafters.

7. The system of claim 6, wherein the laser system is angled with respect to the ridge line of the one or more rafters.

8. The system of claim 7, wherein the laser system is angled at 45 degrees with respect to the ridge line of one or more rafters.

9. The system of claim 1, comprising a plurality of mist nets configured in a 90 degree block pattern.

10. The system of claim 1, comprising a plurality of mist nets configured in a back-to-back wall pattern.

11. The system of claim 10, wherein the mist nets are configured with staggered heights.

12. The system of claim 10, wherein the mist nets are configured with varying lengths.

13. The system of claim 10, wherein the mist nets are configured with staggered heights and varying lengths.

14. The system of claim 10, comprising a plurality of mist nets in a U-shape corral configuration.

15. The system of claim 10, comprising a plurality of mist nets in a U-shape funnel configuration.

16. The system of claim 1, further comprising sound devices to make sounds that initiate movement of a bird.

17. The system of claim 1, further comprising sound devices to make sounds that imitate the call of a bird.

18. The system of claim 1, further comprising traps.

19. The system of claim 18, wherein the traps are baited traps.

20. The system of claim 1, further comprising lights that are strobed.

21. The system of claim 20, wherein the multi-projection laser system is strobed.

22. The system of claim 1, further comprising lights that are patterned.

23. The system of claim 22, wherein the multi-projection laser system provides patterned laser beams.

24. A method of corralling birds, comprising:
employing a multi-projection laser system configured to produce a plurality of laser beams that impinge on a portion of an enclosure proximal one or more mist nets in a configuration; and
employing the one or more mist nets so as to catch the birds in the enclosure;
wherein the one or more mist nets are placed such that the plurality of laser beams causes the birds to fly into the one or more mist nets for safe and humane removal of the birds from the enclosure.

25. The method of claim 24, further comprising using sound devices to make sounds that initiate movement of a bird.

26. The method of claim 24, further comprising using sound devices to make sounds that imitate the call of a bird.

27. The method of claim 24, further comprising using traps to trap birds in an enclosure.

28. The method of claim 27, wherein the traps are baited traps.

29. A system for control of birds in an enclosure, comprising:
capture means for capturing birds in flight, including attachment means for attaching and positioning the capture means in the enclosure; and
light projection means for producing a plurality of laser beams that impinge on a portion of the enclosure proximal to the capture means,
wherein the light projection means is configured with the capture means to produce light that causes the birds to fly into the capture means for safe and humane removal of the birds from the enclosure.

30. The system of claim 29, wherein the attachment means includes shelf strings.

* * * * *